2,915,168

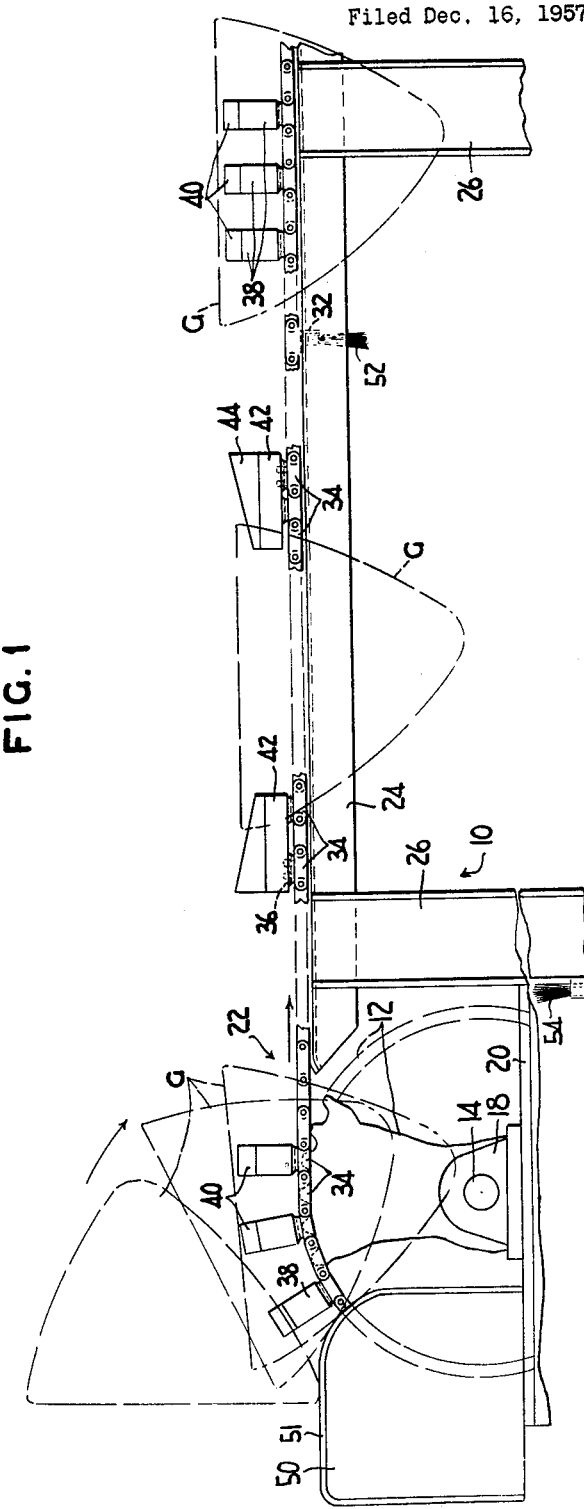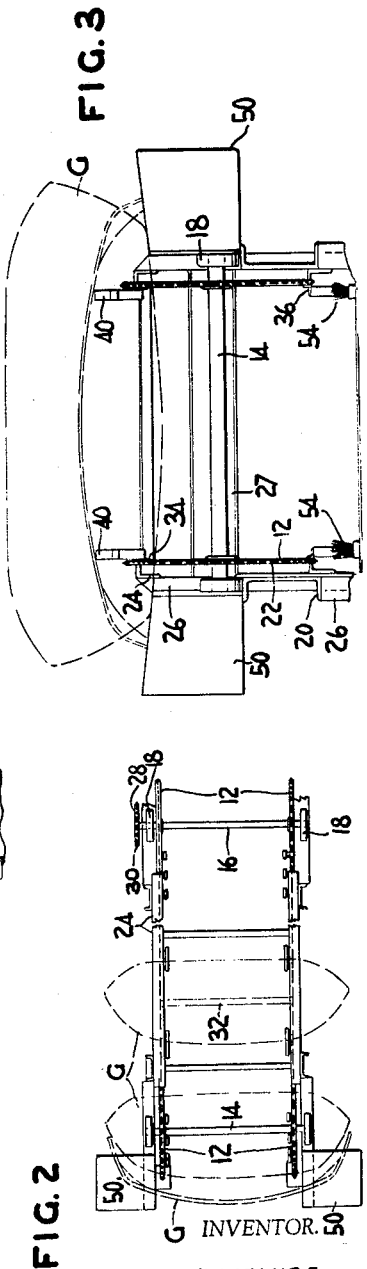

APPARATUS FOR PREPARING COMPOSITE ASSEMBLY

Le Roy S. Whitmire, Crystal City, Mo., assignor to Pittsburgh Plate Glass Company, Allegheny County, Pa., a corporation of Pennsylvania Application December 16, 1957, Serial No. 703,113

6 Claims. (Cl. 198—131)

This invention relates to an apparatus for preparing a composite assembly comprising two matched curved glass sheets and a thermoplastic interlayer.

In the preparation of a curved laminate having two matched curved glass sheets and a thermoplastic interlayer bonded to the glass sheets, such as a curved windshield, a pair of matched curved glass sheets is prepared. This is done conventionally by bending the two glass sheets together to provide the matching relationship. To place the thermoplastic sheet, such as a plasticized polyvinyl butyral sheet, between the pair of matched curved glass sheets it is necessary to separate the pair of glass sheets. Originally this was done after placing the pair of glass sheets on a support with the outer sheet of the pair resting on the support so that the ends of the pair pointed upwardly. The pair was separated by lifting the inside glass sheet from the outer glass sheet and the thermoplastic sheet was placed on the concave surface of the latter. The inner glass sheet was placed on the thermoplastic sheet to form the composite assembly that was subjected to a process for bonding the interlayer to the two glass sheets.

This process of preparing the composite assembly was carried out on an assembly line basis. The pairs of the matched curved glass sheets were placed in sequence on a belt conveyor with the outer glass sheet at its central section resting on the belt. The other or inner glass sheet was lifted from the outer glass sheet and placed alongside the outer glass sheet so that the former was supported in a tilted position with portions of the edges of the end sections and the central section along one side in contact with the conveyor belt. At another station along the path traversed by the conveyor belt the thermoplastic sheet was placed on the outer glass sheet. The inner glass sheet was lifted from the conveyor belt, was rotated about its longitudinal axis to reorient the sheet and was lowered onto the thermoplastic interlayer.

Recently there has been developed an improved method and apparatus for preparing the composite assembly. Whereas initially the pair of matched curved glass sheets was placed on the conveyor with the longitudinal axis of the pair being parallel to the direction of travel of the conveyor belt, the improved method, in its production line application, places the pair of matched curved glass sheets on a conveyor so that the longitudinal axis of the pair extends transversely to the direction of travel of the conveyor. Furthermore, the glass sheets are supported so that the convex surface of each curved glass sheet faces upwardly. The support for each sheet is at transversely spaced areas between the center of the sheet and its ends. While the sheets are thus supported by the conveyor the sheets of the pair, separated from each other, are moved along by the conveyor through an assembly zone where operators on each side of the conveyor can conveniently drape a sheet of the thermoplastic material over the upwardly facing convex surface of the inner glass sheet. The operators lift the other glass sheet and place it on top of the thermoplastic sheet on the inner glass sheet. With this method the composite assembly thus produced is moved along by the conveyor through a station where plastic sheeting that extends beyond the glass sheets is removed by a razor blade. Beyond this station the composite assembly can be moved from the conveyor and subjected to one of the various methods that have been developed for bonding the thermoplastic sheet to the curved glass sheets. The apparatus and this method of preparing the composite assembly with the ends of the separated pair of matched curved glass sheets pointing downwardly so that the thermoplastic sheet can be placed on the convex surface of the inner glass sheet are disclosed and claimed in assignee's copending patent application Serial No. 667,262, entitled "Method and Apparatus for Preparing Composite Assembly," filed on June 21, 1957, by Earl R. Smith and Harry L. Ziegler.

In the apparatus specifically disclosed by the copending application there are provided carriages moved in a cyclic path by a pair of chains. The carriages support the separated curved glass sheets with their ends pointing downwardly. The carriages have transversely spaced pairs of arms on which are mounted the support blocks for the glass sheets. The arms of each pair of supports on each carriage extend in opposite directions from the carriage and parallel to the path of movement provided by the chains. The support pad on each rearwardly extending support arm of each carriage has a notch in the surface that faces the pad on the forwardly extending arm.

The apparatus has an inclined portion of travel for the chains at the loading end so that the pair of matched curved glass sheets can be placed on one of the carriages as it is moving upwardly along the inclined portion of travel. The pair of sheets are positioned so that the sheets rest in the notches of the rearwardly extending support pads. The operator lifts the outer glass sheet from the carriage and holds it until the next carriage arrives at that station when he places the outer glass sheet on that carriage so that it rests on the notches of its rearwardly extending support pads.

When the pair of separated glass sheets and their supporting carriages reach the top run of the apparatus the outer glass sheet is lifted from its carriage and repositioned on the carriage so that it rests on the top of all support pads for the carriage. After the thermoplastic sheet is draped over that glass sheet the other glass sheet, being moved and supported by the following carriage, is lifted and placed on top of the thermoplastic sheet previously placed on the outer glass sheet.

It is an object of the present invention to provide an apparatus for preparing a composite assembly in which the apparatus has sets of supports constructed to minimize the amount of manual handling of the glass sheets of a pair.

Another object of the present invention is to provide an apparatus having alternate sets of supports constructed so that one set can support without manual movement the inner glass sheet from the time of the loading until the composite assembly is prepared and the next set supports the outer glass sheet with a minimum contact of its concave surface until that sheet is to be positioned on the thermoplastic sheet on the other glass sheet.

A further object of the present invention is to provide an apparatus for preparing a composite assembly that includes a conveyor and means for supporting a pair of curved matched glass sheets so that each sheet can be readily loaded onto the conveyor.

These and other objects of the present invention will be apparent to one skilled in the art from the description which follows for a preferred embodiment of the invention when taken in conjunction with the drawing in which similar parts are designated by the same numeral and in which:

Fig. 1 is an elevation of part of the apparatus showing the loading end of the apparatus;

Fig. 2 is a plan view of the apparatus; and

Fig. 3 is an end elevation of the apparatus as viewed at the left-hand end of Fig. 1.

The apparatus has a supporting structure generally indicated at 10. The apparatus has two pairs of sprockets 12. One pair of sprockets 12 is keyed on shaft 14 and the other pair of sprockets 12 is keyed on shaft 16. Shafts 14 and 16 are rotatably mounted to the supporting structure by means of bearings 18 secured on horizontal channel irons 20 of the supporting structure 10. A pair of chains generally indicated at 22 engage sprockets 12. The chains 22 are supported at top run by a pair of chain supports 24 secured to two rows of longitudinally spaced upright channel irons 26 of the supporting structure 10. The rows of channel irons 26 are connected by transverse channel irons 27.

A sprocket 28 is keyed on shaft 16 near one end and is rotated by a chain 30 driven by motor means (not shown).

A number of spacer angle irons 32 are joined at their ends to flanged links 34 of chains 22. Some of the links 34 have horizontal top flanges 36 on which are secured supports 38. Resilient, such as rubber, supports 40 are secured on top of supports 38. The supports 40 on supports 38 are mounted on chains 22 to provide sets of supports 40 on each chain 22. In a set supports 40 on one chain 22 are opposite supports 40 on the other chain 22. The supports 40 of each set are positioned so that a curved glass sheet G can be supported by them at transversely spaced areas of the glass sheet G between its center and its ends. In the illustrative embodiment the set of supports 40 has three spaced apart supports 40 on each chain 22.

Between each set of supports 40 on each chain 22 there are two spaced apart pairs of adjacent links 34, each having a horizontal top flange 36. Secured on flange 36 of one link 34 of each pair is a support 42 on which is secured a resilient, such as rubber, support 44. Each support 42 rests on flange 36 of adjacent link 34 when support 42 is being moved in a horizontal top run of chains 22. With this construction there is provided sets of four supports 44 alternately arranged with sets of supports 40 around chains 22.

The top surface of each of supports 40 is generally flat. Supports 40 preferably have parallel surfaces. On each chain 22 end supports 40 of a set are sufficiently close to each other to support curved glass sheet G inwardly of the margin, i.e., so that supports 40 do not extend beyond glass sheet G. The supports 44 have glass-sheet-supporting surfaces that are inclined. For each set the pair of supports 44 on each chain between the sets of supports 40 have these inclined surfaces facing each other as shown in Fig. 1.

The chains are moved in the direction indicated by the arrow in Fig. 1. Thus the top run of chains 22 is from the loading end shown at the left in Figs. 1 and 2 to the unloading end shown at the right in Fig. 2. At the loading end a pair of support blocks 50 is mounted on channel irons 20. The sprockets 12 on shaft 14 are between blocks 50 which are to the left, as viewed in Fig. 1, of the shaft 14. The top surface of each block 50 is substantially in the horizontal plane of the top run of chains 22. The top surface is preferably resilient and for the reason a rubber sheet 51 covers block 50. Each block 50 has a convex top portion facing the top run of chains 22. With this construction a pair of curved matched glass sheets G can be placed on the pair of blocks 50 with the concave surfaces of the pair facing generally the direction of travel of the top run of chains 22.

As shown diagrammatically in Figs. 1, 2 and 3 a glass sheet G of the pair placed on blocks 50 is tilted onto a set of blocks 40 or a set of blocks 44 as the set and the links 34 supporting them are at the last portion of their engagement with sprocket 12 on shaft 14. Of course, the leading support 40 or 44 on each chain 22 of a set can already be in the top horizontal run of chains 22. Because of the convex top portions of each block 50 facing the top run of chains 22, the glass sheet G on blocks 50 can be tilted as indicated and yet the blocks 50 support the curved glass sheet G during the tilting action. For certain patterns of curvature of glass sheets G it is also desirable that the blocks 50 have inclined top surfaces as seen in Fig. 3. The inclined top surfaces are sloped downwardly toward sprockets 12 on shaft 14.

As mentioned above, on chains 22 the sets of supports 44 alternate with sets of supports 40. After a pair of curved matched glass sheets G is placed on blocks 50, the inner curved glass sheet G is tilted to place it on a set of blocks 40 on moving chains 22 while still holding the outer curved glass sheet G in the upright position. After the inner glass sheet G has been placed on a set of supports 40, the outer glass sheet G is tilted when a set of supports 44 moves into position and it is placed first on the inclined surfaces of the leading supports 44 of a set and finally on the inclined surfaces of the trailing supports 44 of the set. The final positions of sheets G on sets of supports 40 and 44 moving horizontally in the first position of the top run of chains 22 are shown in Fig. 1.

From the construction that has been described it is apparent that a pair of matched glass sheets G can be readily supported by blocks 50 until they are tilted one at a time for placement on different sets of supports.

The first set of supports is completely below the glass sheet G that it supports. The other set of supports has inclined top surfaces that are spaced to extend beyond the outer glass sheet G so that there is narrow marginal contact by supports 44 against the concave surface of the glass sheet G that it supports. In the composite assembly this concave surface of the outer glass sheet abuts the thermoplastic interlayer. To reduce the chance of transfer of dirt from supports 44 to that concave glass surface, the inclined surfaces of supports 44 provide a minimum of contact. Of course, the convex surface of the inner glass sheet G does not contact supports 40 which support instead the concave surface. It is the convex surface of inner glass sheet G that will be in contact with the thermoplastic sheet for bonding. Thus any transfer of dirt from supports 40 will be readily removed after the composite assembly has been laminated.

With the apparatus of this invention each of the glass sheets G of a matched pair is placed on a moving support. No further manual movement of either glass sheet G is required until a thermoplastic sheet (not shown) is placed on the inner glass sheet G by operators on each side of the apparatus. After the thermoplastic sheet is draped on the inner glass sheet G the outer glass sheet G is lifted from supports 44 and placed on the thermoplastic sheet resting on the inner glass sheet G on supports 40. The resultant composite assembly on the set of supports 40 is moved by chains 22 moving further along their top run. During this movement the operators remove excess plastic that extends beyond the glass sheets G by cutting the excess with a razor blade. Some of excess plastic falls onto a shelf (not shown) below and between the top run of chains 22. Some of the spacer angle irons 32 have downwardly extending flanges to which are secured brushes 52 that contact the shelf and move the trimmed excess plastic to the end of the shelf and push the plastic trimmings into a hopper (not shown).

A pair of upwardly extending brushes 54 is mounted to upright channel irons 26 of supporting structure 10 so that brushes 54 wipe the top surfaces of supports 40 and 44 as they are moved along the bottom run of their cyclic path.

The foregoing is a description of the preferred embodiment of the apparatus and is given for purpose of illustration only. Various modifications of the apparatus will be apparent to one skilled in the art from the description and the drawing. The invention is limited only by the claims which follow.

I claim:

1. An apparatus for the preparation of a curved composite assembly including two matched curved glass sheets and a thermoplastic interlayer which comprises a supporting structure, a pair of chains in parallel planes, a pair of sprockets for each chain to move each chain in a cyclic path, said pairs of sprockets being rotatably mounted to the supporting structure, means for rotating one sprocket of each pair, means for supporting said chains in a horizontal top portion of their cyclic path, and supports, each having a resilient top portion, mounted to each chain substantially opposite supports on the other chain and spaced from supports on the same chain to provide sets of at least four of said supports on said chains, the supports of each set having a generally flat top surface and being spaced to provide by said set for support for a curved glass sheet at transversely spaced areas of the glass sheet between the center and the ends of the sheet and the distance between adjacent sets being substantially greater than the distance between adjacent supports in the same set and on the same chain.

2. An apparatus for the preparation of a curved composite assembly including two matched curved glass sheets and a thermoplastic interlayer which comprises a supporting structure, a pair of chains in parallel planes, first and second pairs of sprockets rotatably mounted to the supporting structure, each of said chains engaging a sprocket of each pair of sprockets, means for rotating the first pair of sprockets, means for supporting said chains in a horizontal top portion of their cyclic path, supports mounted to each chain substantially opposite supports on the other chain and spaced from supports on the same chain to provide sets of at least four of said supports on said chains, the supports of each set being spaced to provide support for a curved glass sheet, and a pair of support blocks mounted to the supporting structure adjacent the second pair of sprockets, each of said support blocks having a top surface below and adjacent the horizontal plane of said top run of said chains and each block having a convex top portion facing said top run, and said second pair of sprockets being between said pair of support blocks.

3. The apparatus of claim 2 wherein the top surfaces of said support lbocks are inclined downwardly toward said second pair of sprockets.

4. An apparatus for the preparation of a curved composite assembly including two matched curved glass sheets and a thermoplastic interlayer which comprises a supporting structure, a pair of chains in parallel planes, first and second pairs of sprockets rotatably mounted to the supporting structure, each of said chains engaging a sprocket of each pair of sprockets, means for rotating the first pair of sprockets, means for supporting said chains in a horizontal top portion of their cyclic path, first sets of supports mounted to each chain, each of said first sets of supports having a pair of supports on each chain substantially opposite supports on the other chain to provide by each set on the two chains at least four non-marginal support areas for a curved glass sheet, and second sets of supports mounted on each chain, each of said second sets of supports having a pair of spaced apart supports on each chain substantially opposite supports on the other chain, the two supports of each pair of the second sets on each chain having inclined top surfaces facing each other whereby supports of a second set for both chains provide four narrow marginal support areas for a curved glass sheet.

5. The apparatus of claim 4 wherein said second sets of supports are mounted on said chains alternately with said first set of supports.

6. An apparatus for the preparation of a curved composite assembly including two matched curved glass sheets and a thermoplastic interlayer which comprises a supporting structure, a pair of chains in parallel planes, first and second pairs of sprockets rotatably mounted to the supporting structure, each of said chains engaging a sprocket of each pair of sprockets, means for rotating the first pair of sprockets, means for supporting said chains in a horizontal top portion of their cyclic path, first sets of supports mounted to each chain, each of said first sets of supports having a pair of supports on each chain substantially opposite supports on the other chain to provide by each set on the two chains at least four non-marginal support areas for a curved glass sheet, second sets of supports mounted on each chain, each of said second sets of supports having a pair of spaced apart supports on each chain substantially opposite supports on the other chain, the two supports of each pair of the second sets on each chain having inclined top surfaces facing each other whereby supports of a second set for both chains provide four narrow marginal support areas for a curved glass sheet, said second sets of supports being mounted on said chains alternately with said first set of supports, and a pair of support blocks mounted to the supporting structure adjacent the second pair of sprockets, each of said support blocks having a top surface substantially in the horizontal plane of said top run of said chains and each block having a convex top portion facing said top run, and said second pair of sprockets being between said pair of support blocks.

References Cited in the file of this patent

UNITED STATES PATENTS 2,169,772   Schweitzer _____ Aug. 15, 1939

FOREIGN PATENTS 386,554   Great Britain _____ Jan. 19, 1933